United States Patent
Yoon et al.

(10) Patent No.: US 9,547,392 B2
(45) Date of Patent: Jan. 17, 2017

(54) MOBILE TERMINAL AND CONTROLLING METHOD THEREOF

(71) Applicant: LG ELECTRONICS INC., Seoul (KR)

(72) Inventors: Changgeol Yoon, Seoul (KR); Eunsuk Kang, Seoul (KR); Jungju Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 14/512,101

(22) Filed: Oct. 10, 2014

(65) Prior Publication Data

US 2015/0103002 A1  Apr. 16, 2015

(30) Foreign Application Priority Data

Oct. 11, 2013 (KR) .................. 10-2013-0121284

(51) Int. Cl.
| | |
|---|---|
| *G06F 3/033* | (2013.01) |
| *G09G 5/08* | (2006.01) |
| *G06F 3/041* | (2006.01) |
| *G06F 3/0488* | (2013.01) |
| *H04N 1/00* | (2006.01) |
| *H04N 1/21* | (2006.01) |
| *H04N 5/232* | (2006.01) |

(52) U.S. Cl.
CPC ............ *G06F 3/0418* (2013.01); *G06F 3/033* (2013.01); *G06F 3/0488* (2013.01); *G06F 3/04886* (2013.01); *H04N 1/00392* (2013.01); *H04N 1/00411* (2013.01); *H04N 1/00437* (2013.01); *H04N 1/00925* (2013.01); *H04N 1/212* (2013.01); *H04N 1/215* (2013.01); *H04N 1/2125* (2013.01); *H04N 5/23293* (2013.01); *H04N 2201/0084* (2013.01); *H04N 2201/212* (2013.01); *H04N 2201/3245* (2013.01); *H04N 2201/3273* (2013.01)

(58) Field of Classification Search
CPC .. G06F 3/038; G06F 3/03313; G06F 3/03333; G06F 1/169; G06F 3/0332
USPC .................................. 345/156–158, 173–179
See application file for complete search history.

(56) References Cited

U.S. PATENT DOCUMENTS

| | | | |
|---|---|---|---|
| 8,519,971 B1 | 8/2013 | Mackraz | |
| 8,766,934 B2 * | 7/2014 | Jeong | ............... G06F 3/0488 |
| | | | 178/18.01 |
| 9,086,499 B2 * | 7/2015 | Medeiros | .............. G01S 3/7864 |

(Continued)

FOREIGN PATENT DOCUMENTS

| | | |
|---|---|---|
| EP | 2169946 A2 | 3/2010 |
| JP | 2006-311209 A | 11/2006 |
| WO | WO 2007/116977 A1 | 10/2007 |

*Primary Examiner* — Kimnhung Nguyen
(74) *Attorney, Agent, or Firm* — Birch, Stewart, Kolasch & Birch, LLP

(57) ABSTRACT

A method of controlling a mobile terminal, and which includes entering, via a controller controlling a camera of the mobile terminal, a camera photograph mode; determining, via the controller of the mobile terminal, a position of a first pointer contacting a touchscreen in the camera photograph mode and whether the first pointer is in a first state or a second state when the first pointer is located in a preset region on the touchscreen; ignoring a touch input through the pointer, when the first pointer is determined as being in the first state; and performing a function corresponding to the touch input through the pointer, when the first pointer is determined as being in the second state.

16 Claims, 15 Drawing Sheets

(56) References Cited

U.S. PATENT DOCUMENTS

| | | | |
|---|---|---|---|
| 9,134,902 B2 * | 9/2015 | Kang | G06F 3/04883 |
| 2008/0204402 A1 | 8/2008 | Hirata et al. | |
| 2009/0268074 A1 | 10/2009 | Sugino | |
| 2010/0321503 A1 | 12/2010 | Sakata | |
| 2011/0012989 A1 | 1/2011 | Tseng et al. | |
| 2012/0032979 A1 | 2/2012 | Blow et al. | |
| 2012/0162464 A1 | 6/2012 | Kim | |
| 2012/0257071 A1 | 10/2012 | Prentice | |
| 2013/0063645 A1 | 3/2013 | Aoyama | |
| 2013/0208163 A1 | 8/2013 | Choi et al. | |
| 2013/0329109 A1 * | 12/2013 | Park | H04N 5/23219 348/333.02 |
| 2014/0096053 A1 * | 4/2014 | Lee | G06F 3/0488 715/769 |
| 2014/0320425 A1 * | 10/2014 | Jeong | G06F 3/1454 345/173 |

* cited by examiner

FIG. 3
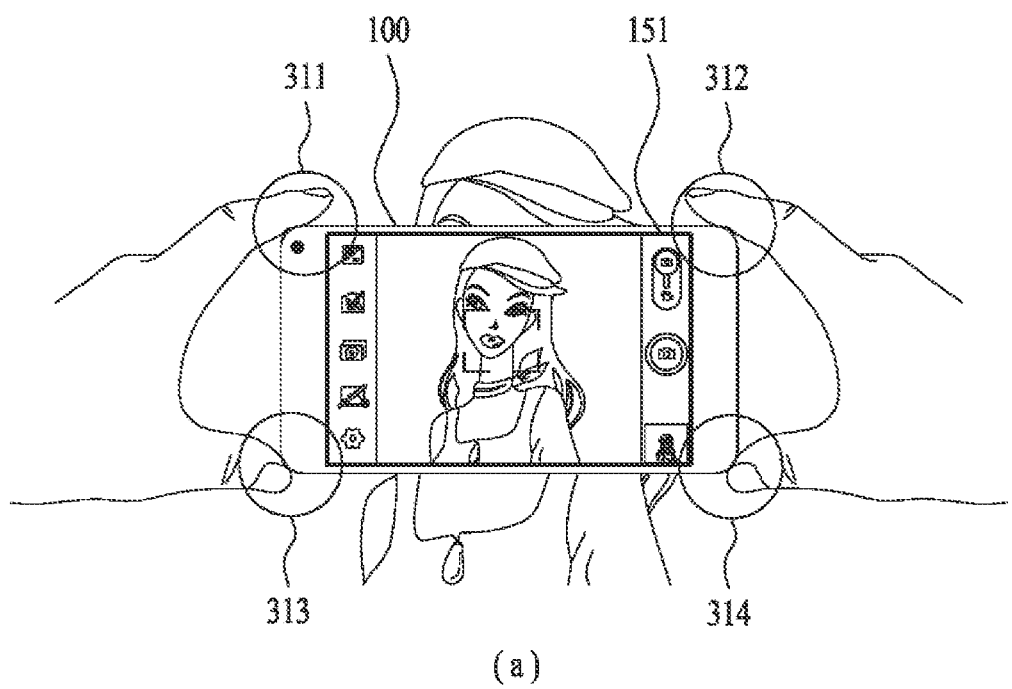
(a)
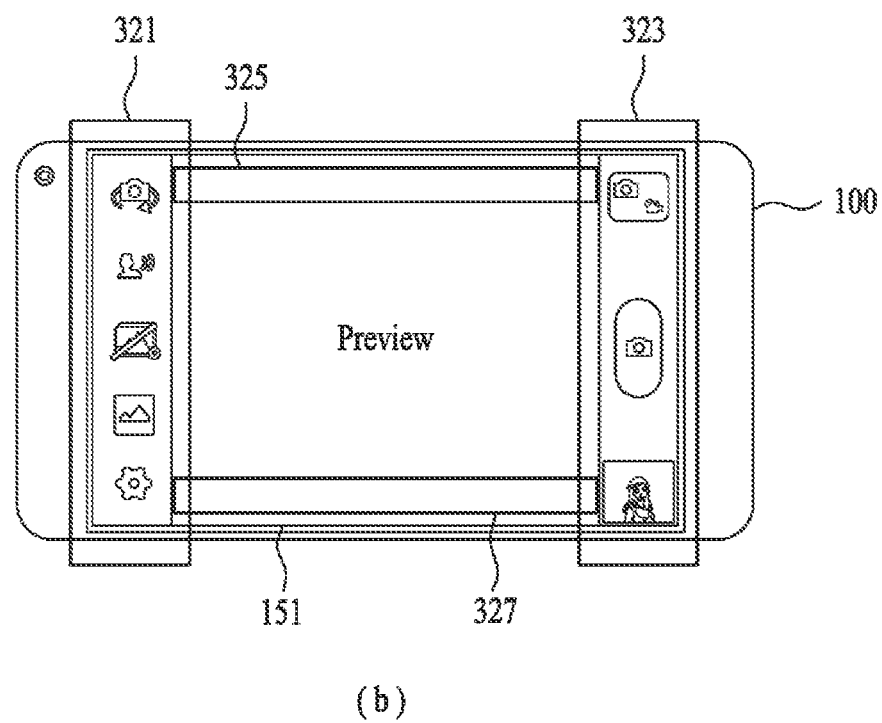
(b)

FIG. 7
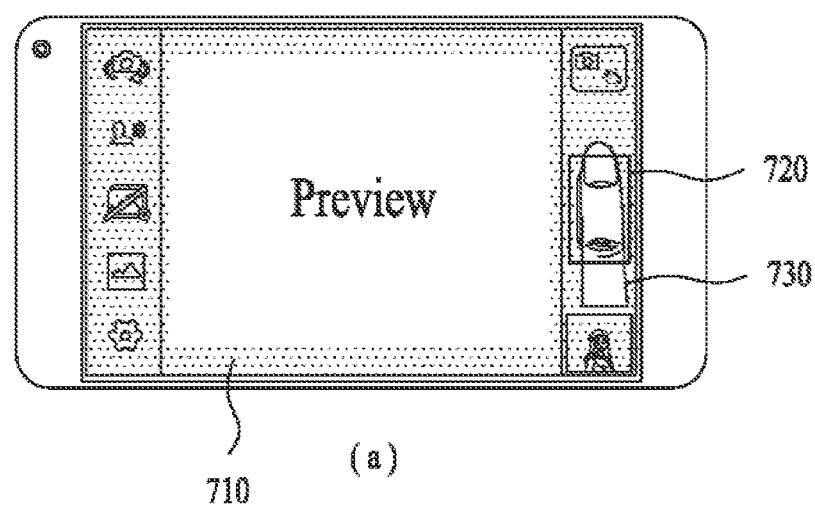
(a)
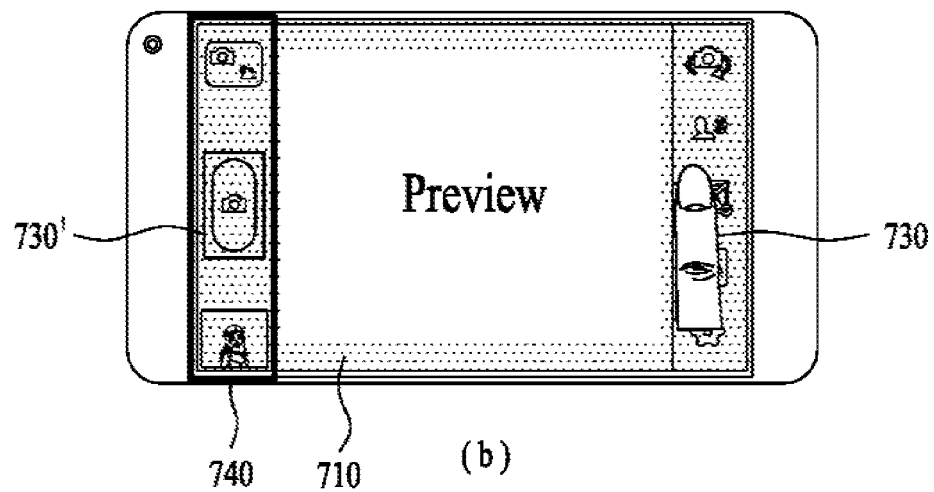
(b)

(a)  (b)

FIG. 11
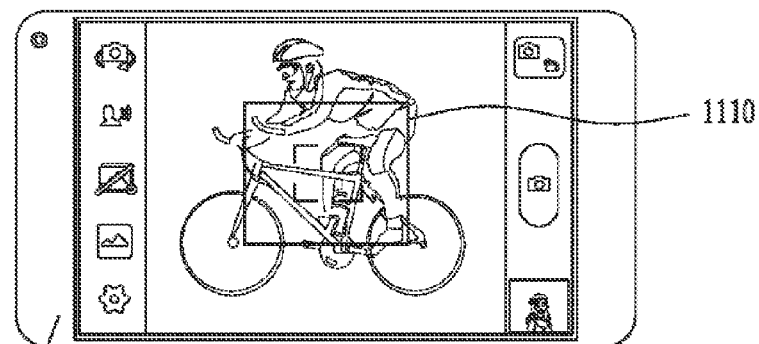
(a)
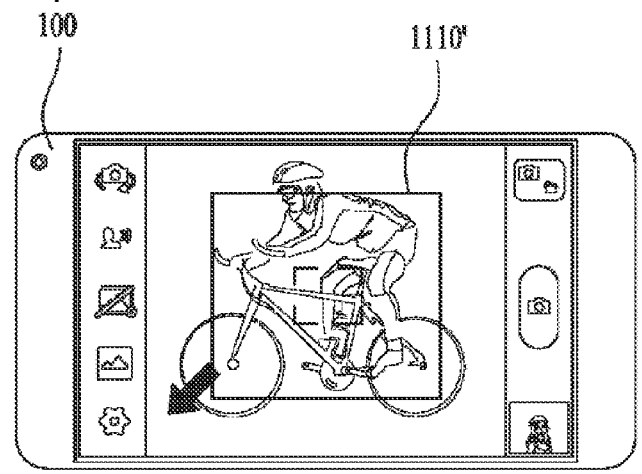
(b)
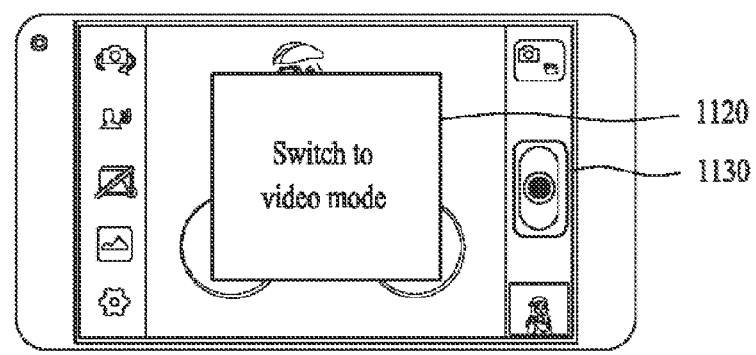
(c)

FIG. 14
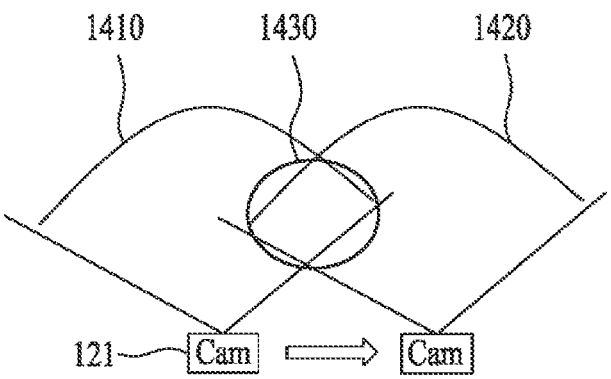
(a)
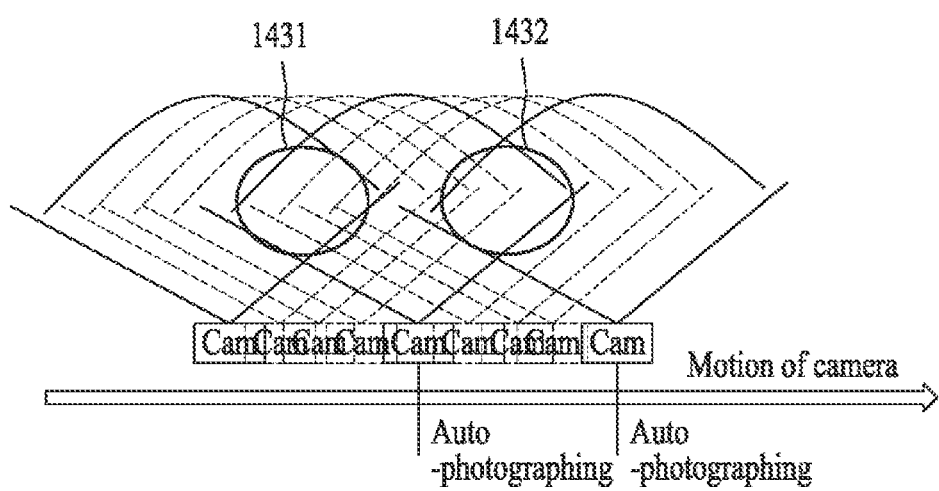
(b)

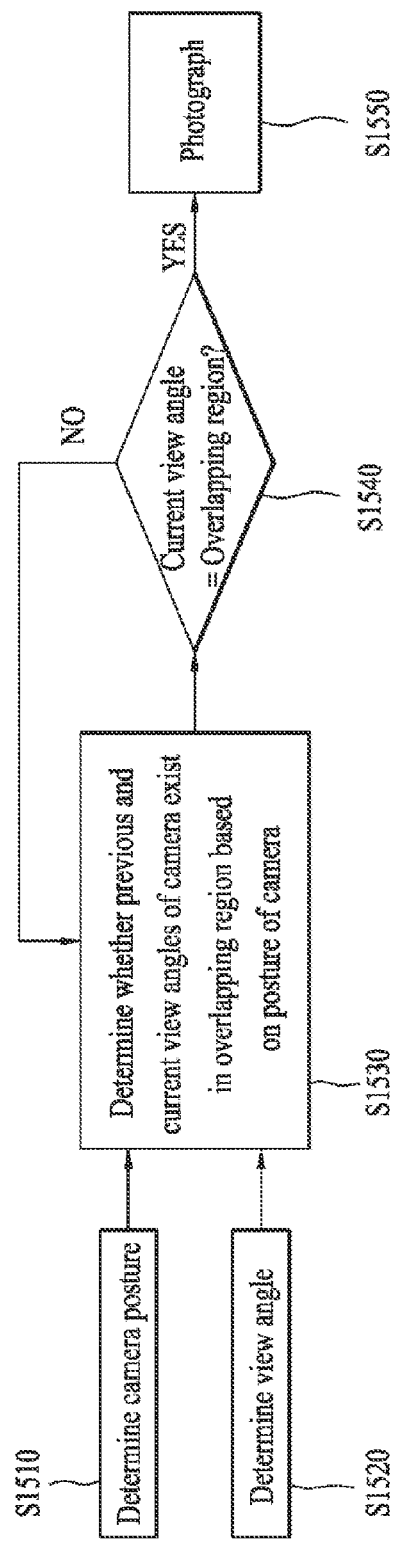

MOBILE TERMINAL AND CONTROLLING METHOD THEREOF

Pursuant to 35 U.S.C. §119(a), this application claims the benefit of earlier filing date and right of priority to Korean Application No. 10-2013-0121284, filed on Oct. 11, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a photographing operation using the mobile terminal.

Discussion of the Related Art

Generally, terminals can be classified into mobile/portable terminals and stationary terminals. The mobile terminals can be further classified into handheld terminals and vehicle mounted terminals. As functions of the terminal are getting diversified, the terminal tends to be implemented as a multimedia player provided with composite functions such as photographing of photos or videos, playback of music or video files, game play, broadcast reception and the like for example.

Recently, as the performance of a camera included with the mobile terminal is increasingly enhanced, image photographing or video using the mobile terminal is increasing. Moreover, a bezel configured enclose a touchscreen becomes thinner, whereas a size of a display provided to the mobile terminal is larger. However, when photographing is performed using camera included with the mobile terminal, the user is inconvenienced because the touchscreen is frequently touched when the user grips the mobile terminal.

SUMMARY OF THE INVENTION

Accordingly, one object of the present invention is to provide a mobile terminal and controlling method thereof that substantially obviate one or more problems due to limitations and disadvantages of the related art.

An object of the present invention is to provide a mobile terminal and controlling method thereof, by which a photographing action can be further facilitated through a camera provided to the mobile terminal.

Another object of the present invention is to provide a mobile terminal and controlling method thereof, by which a grip feeling of the mobile terminal is enhanced on photographing.

Further object of the present invention is to provide a mobile terminal and controlling method thereof, by which malfunction of the mobile terminal can be prevented on photographing.

Another further object of the present invention is to provide a mobile terminal and controlling method thereof, by which a photographing state can be changed in consideration of a motional state of a subject.

Technical tasks obtainable from the present invention are non-limited by the above-mentioned technical tasks. In addition, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a camera, a touchscreen, and a controller determining a position of a first pointer contacting with the touchscreen in camera photograph mode, the controller determining whether the first pointer is in a first state or a second state when being located in a preset region on the touchscreen, the controller, if the first pointer is determined as being in the first state, the controller ignoring a touch input through the pointer, the controller, if the first pointer is determined as being in the second state, performing a function corresponding to the touch input through the pointer.

In another aspect of the present invention, a method of controlling a mobile terminal according to another embodiment of the present invention includes the steps of determining a position of a first pointer contacting with a touchscreen in camera photograph mode, determining whether the first pointer is in a first state or a second state when being located in a preset region on the touchscreen, if the first pointer is determined as being in the first state, ignoring a touch input through the pointer, and if the first pointer is determined as being in the second state, performing a function corresponding to the touch input through the pointer.

In further aspect of the present invention, a mobile terminal according to further embodiment of the present invention includes a camera, a display unit, and a controller displaying a preview image on the display unit by activating the camera, the controller determining a tracking target subject in the preview image, the controller if a motion of the determined tracking target subject is greater than a threshold value, controlling a photograph mode to be changed.

In another further aspect of the present invention, a method of controlling a mobile terminal according to another further embodiment of the present invention includes the steps of displaying a preview image by activating a camera, determining a tracking target subject in the preview image, and if a motion of the determined tracking target subject is greater than a threshold value, changing a photograph mode.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram illustrating one example of a grip zone applicable to the present invention;

FIG. 7 is a diagram illustrating one example of a process for changing a position of a shutter button in a mobile terminal according to one embodiment of the present invention;

FIG. 11 is a diagram illustrating one example of a process for performing a photograph mode change in response to a motion of a subject in a mobile terminal according to another embodiment of the present invention;

FIG. 14 is a diagram illustrating one example of a process for determining a shutter timing through regions having camera view angles overlap each other therein between mobile terminal movements in a mobile terminal according to another embodiment of the present invention; and FIG. 15 is a flowchart illustrating one example of a process for performing a panoramic photographing automatically in a mobile terminal according to another embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. As used herein, the suffixes 'module', 'unit' and 'part' are used to denote elements in order to facilitate the invention only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
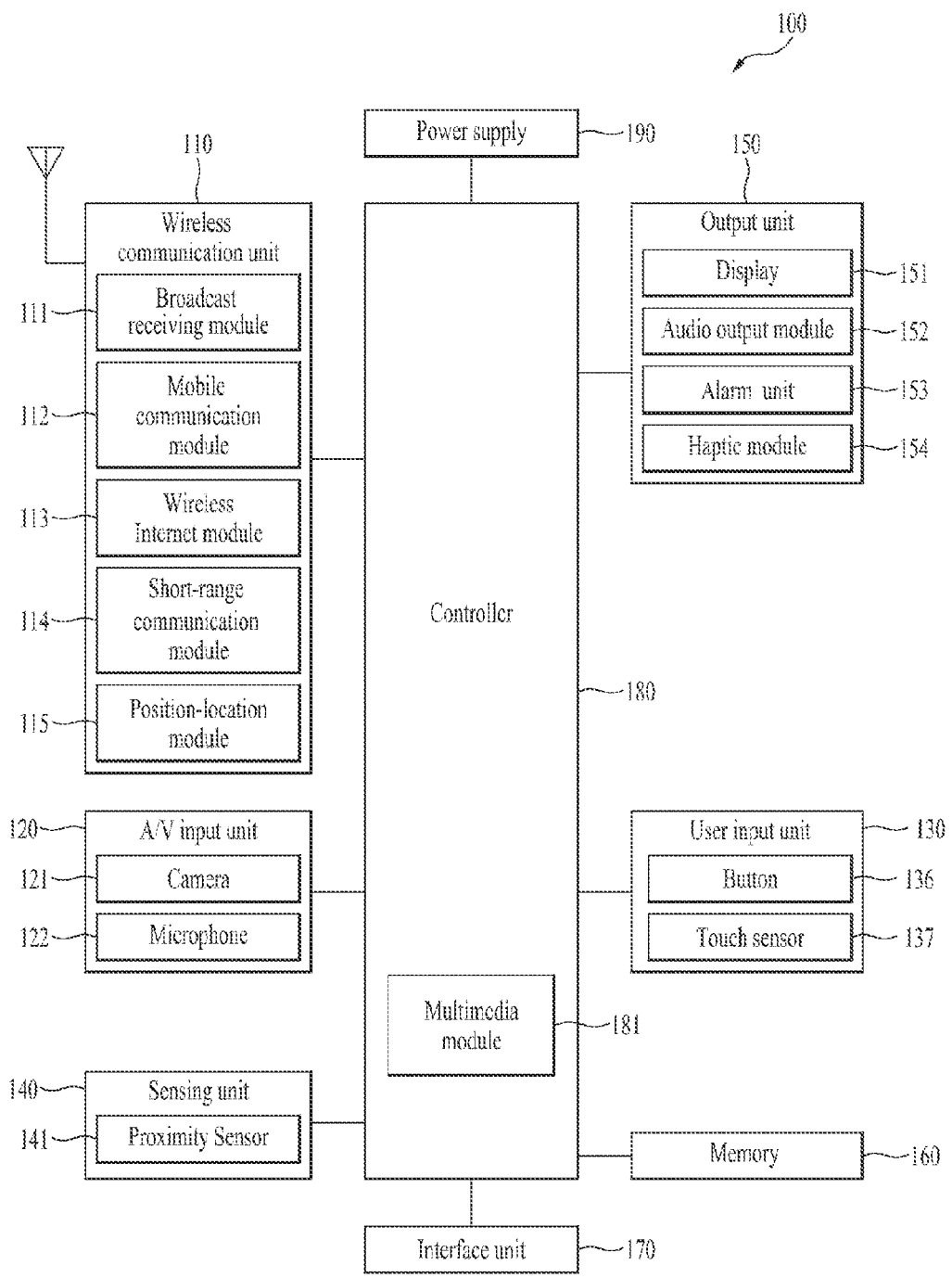
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By a non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems. The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. FIG. 1 also illustrates the user input unit 130 can include a button 136 (hard or soft button) and a touch sensor 137.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, and a haptic module 154. A projector module can also be included for projecting images. Further, the display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays. Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad. The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch. The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 can include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
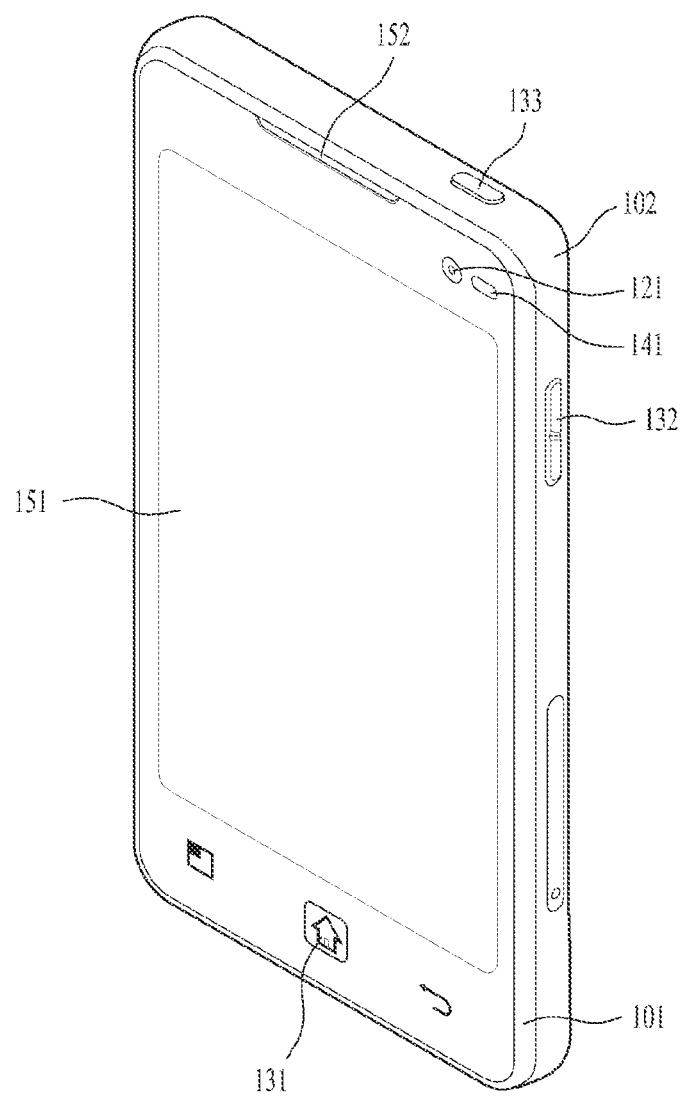
FIG. 2 is a front perspective diagram of a mobile terminal according to one embodiment of the present invention.

FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following invention will primarily relate to a bar-type mobile terminal 100. However, the present invention applies equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display 151, an audio output module 152, a camera 121, manipulating units 131, 132 and 133, a microphone 122, and an interface unit 170 can be provided at the terminal body, and more particularly, at the front case 101. Manipulating units 131, 132 and 133 are part of the user input unit 130.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102. Another manipulating unit 133 can be provided on a top portion of the case 102.

The user input unit 130 is manipulated (operated) to receive a command for controlling an operation of the terminal 100. Furthermore, the user input unit 130 may include a plurality of manipulating units 131, 132 and 133. The manipulating units 131, 132 and 133 can be referred to as a manipulating portion and may adopt any tactile mechanism that enables a user to perform a manipulation action by touch.

Content input by manipulating units 131, 132 and 133 can be divided between the three. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this invention, a graphic displayed on a display unit is named a cursor and such a physical mechanism for performing a touch, a proximity touch, a gesture and the like as a finger, a stylus pen and the like is named a pointer.

Grip and Malfunction Caused Therefrom

FIG. 3 is a diagram illustrating one example of a grip zone applicable to the present invention. Referring to FIG. 3(*a*), when a user performs photographing through the camera 121 of the mobile terminal 100, the user grips a body edge of the mobile terminal 100 with at least two fingers in general. Thus, because contact points 311 to 314 are touched with the fingers located close to the touchscreen, malfunction may occur.

Therefore, according to one embodiment of the present invention, if a contact with a pointer (e.g., a finger, a palm, etc.), which can generate a touch input to a preset prescribed zone, is recognized, the controller 180 determines whether the recognized contact is a contact for a photographing control or a grip contact for holding the mobile terminal tightly. If the pointer's contact is determined as the grip contact, to the controller 180 excludes the touch recognition attributed to the corresponding pointer.

For clarity of the description in the present specification, the preset prescribed zone is named a grip region or grip zone. FIG. 3(*b*) shows one example of the grip zone. Referring to FIG. 3(*b*), within the touchscreen 151, the grip zone can be configured on at least one of a menu region 321, in which icons for function settings of the camera, a shutter region 323, in which a shutter button is arranged, a top end region 325 and a bottom end region 327. The grip zone shown in FIG. 3(*b*) includes a plurality of regions located close to a bezel and corresponds to a region in which it is highly possible to have a grip contact generated therein by a user, by which the present invention is non-limited. In addition, the grip zone is adjustable depending on a user's grip tendency or pattern or a photographing environment.

Figure 4:
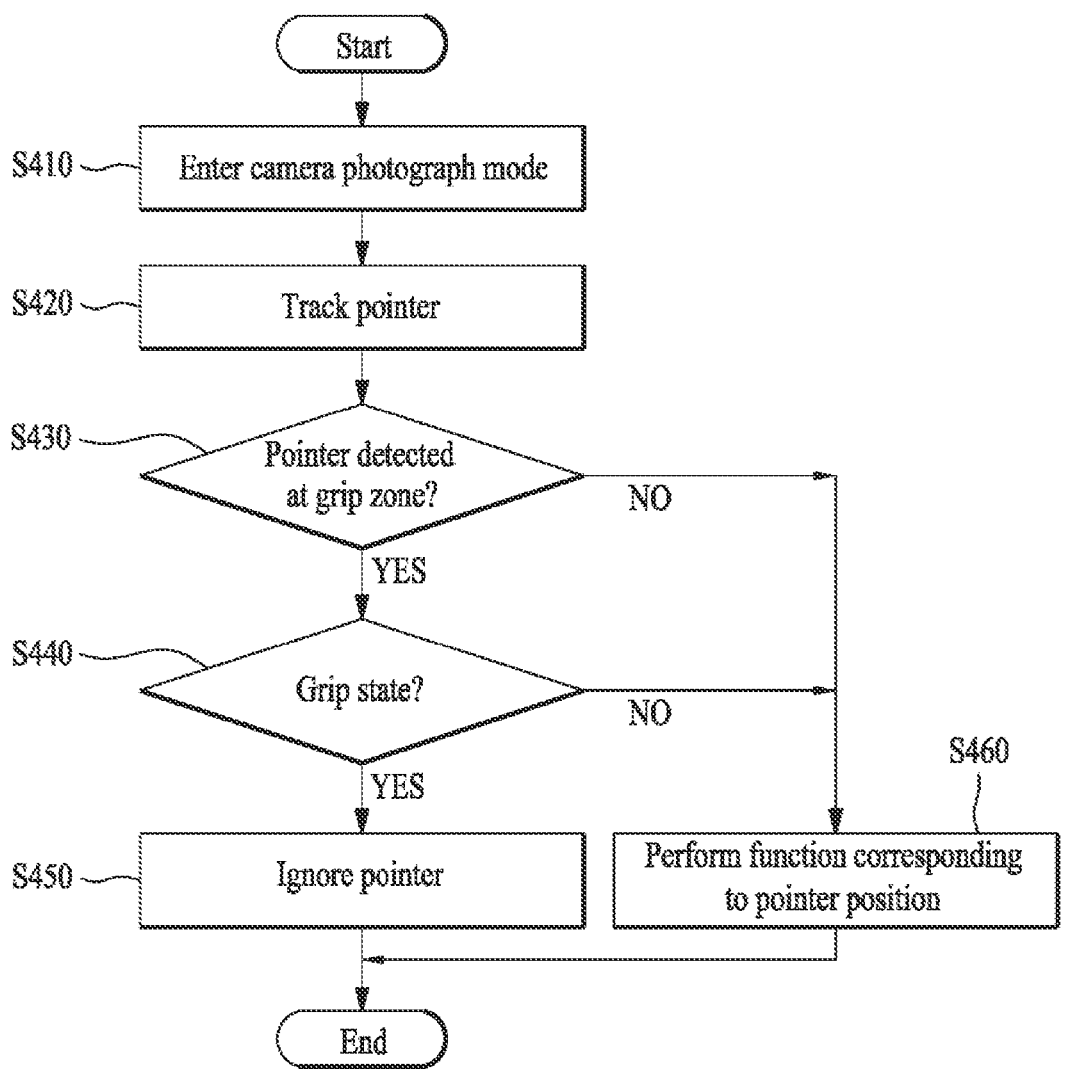
FIG. 4 is a flowchart of a process for recognizing a pointer in accordance with a position of a pointer on performing photographing in a mobile terminal according to one embodiment of the present invention.

Next, FIG. 4 is a flowchart of a process for a position of a pointer when performing photographing in a mobile terminal according to one embodiment of the present invention. Referring to FIG. 4, the controller can enter a camera photograph mode (S410). In particular, the camera photograph mode can be entered if a user touches an icon corresponding to a camera application. Alternatively, the camera photograph mode can be entered if a menu (e.g., a photographed image transmission in a messenger/message application, etc.) necessary to acquire an image is selected from another application.

As the camera photograph mode is entered, a preview image taken through the camera 121 is displayed on the touchscreen and a position tracking of a recognized pointer is performed on the touchscreen (S420). The controller 180 determines whether a position of the tracked pointer is located at a preset grip zone (S430). If the pointer is located at the grip zone (Yes in S430), the controller 180 can determine whether the corresponding pointer is located at the grip zone for a control input (e.g., a selection of a menu icon, a selection of a shutter button, etc.) or whether the corresponding pointer is located at the grip zone in the course of gripping the mobile terminal (i.e., in a grip state) (S440).

In particular, to the controller 180 can make the determination of a presence or non-presence of the grip state in consideration of a time taken for the pointer to be located at the grip zone and a movement of the pointer during the corresponding time. This determining method shall be described in detail with reference to FIG. 6.

As a result of the determination, if the grip state is determined (Yes in S440), the controller 180 can ignore a contact state of the corresponding pointer (i.e., processed as no touch input is present at the position of the pointer) (S450). If the pointer is located at a place other than the grip zone or the pointer is determined as not in the grip state despite being located at the grip zone (No in S440), the controller 180 can perform a function corresponding to the position of the pointer (e.g., recognizing a touch/long-touch/flicking/touch-drag to the corresponding position in accordance with a touch pattern) (S460).

In the following description, when a pointer is located at a grip zone by the above-mentioned pointer recognizing process, an operation of the mobile terminal is explained in detail with reference to FIG. 5. In particular, FIG. 5 is a diagram illustrating one example of a process for entering a camera photograph mode when a pointer is located at a grip zone in a mobile terminal according to one embodiment of the present invention.

Figure 5:
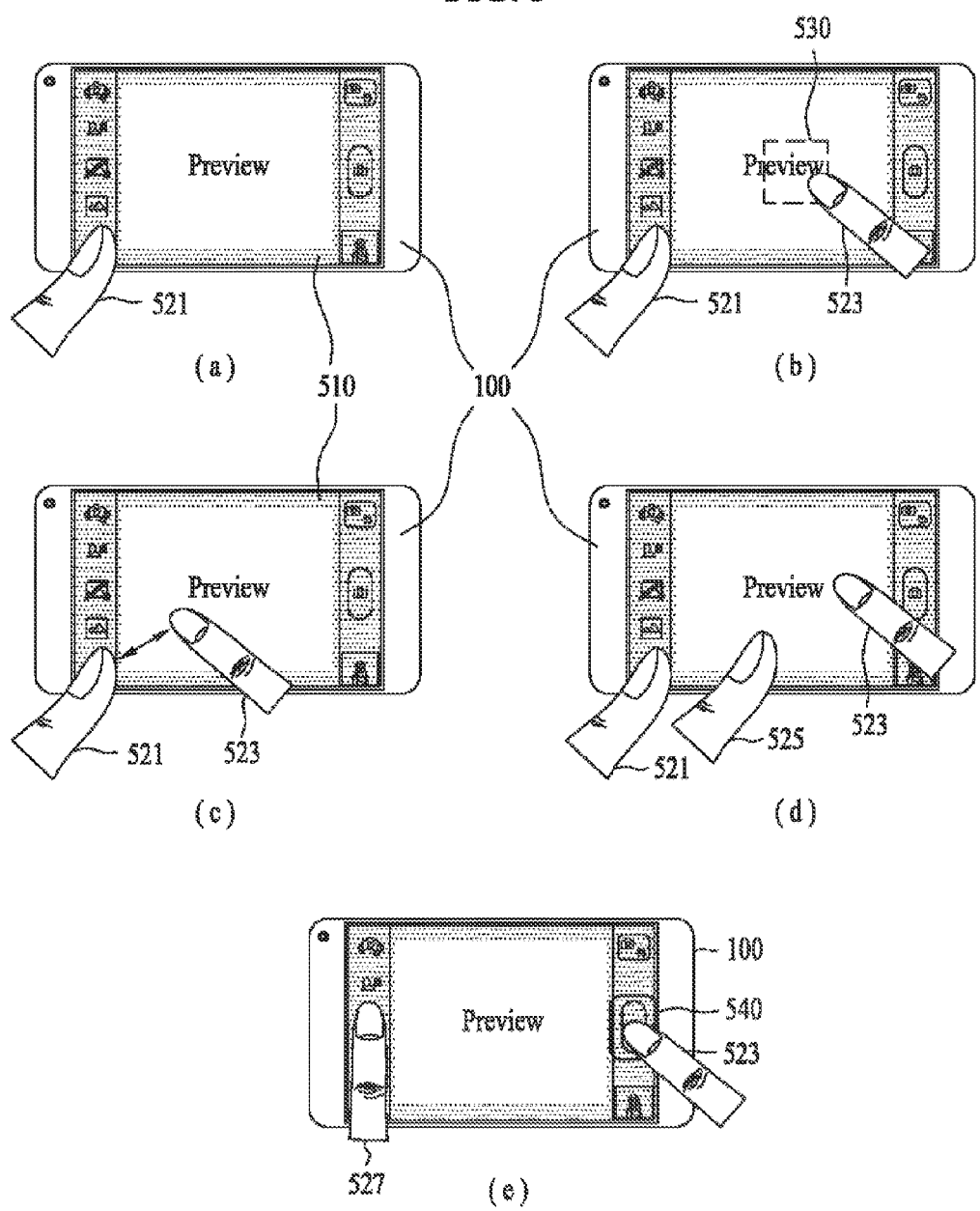
FIG. 5 is a diagram illustrating one example of a process for entering a camera photograph mode when a pointer is located at a grip zone in a mobile terminal according to one embodiment of the present invention.

In FIG. 5, a grip zone 510 is assumed to be on four sides (e.g., top, bottom, right and left sides) of the touchscreen in prescribed widths. Referring to FIG. 5(*a*), as a camera photograph mode is entered, when a preview image is displayed on the touchscreen, a user's finger 521 is maintained at a grip zone 510. Thus, for a general mobile terminal, if a long-touch action occurs or a prescribed point of the preview image is touched with a different finger 523 to determine a focus point (FIG. 5(*b*)), since it is recognized that the finger at the grip region is in a touch state, no operation is performed. Yet, according to an embodiment of the present invention, if the controller 180 determines that the finger 521 is in a grip state, since a touch input through the corresponding finger 521 is ignored, a touch input through the different finger 523 is recognized to determine a focus point in the situation shown in FIG. 5(*b*).

When zooming-in/out, if the controller 180 determines that the finger located at the grip zone is in the grip state (FIG. 5(*c*)), although a distance from the touch point of the different finger 523 is changed, the zoom-in/out does not occur. If a distance between the different finger 523 and another different finger 525 is changed, the zoom-in/out may occur as shown in FIG. 5(*d*).

Regarding a shutter button, referring to FIG. 5(*e*), when a palm or finger 527 touches the grip zone, when a general mobile terminal, although a shutter button 540 is touched with a finger 523, a photographing action is not performed. Yet, according to an embodiment of the present invention, since the palm or finger 527 at the grip zone is ignored, a photographing action can be activated. As mentioned in the above description, according to an embodiment of the present invention, although a user touches the touchscreen with a hand in the course of gripping the mobile terminal, if a grip zone is touched with a finger, the user can conveniently manipulate the mobile terminal without being concerned about malfunction.

A method of determining a grip state is described in detail as follows. First of all, one embodiment of the present invention includes two threshold values and one threshold time to determine a grip state. In particular, when a touch with a pointer is detected, and if a motion of the pointer is smaller than a trembling threshold value, the controller 180 can determine that the pointer is in a grip state. If the motion of the pointer is greater than the trembling threshold value, the controller 180 can determine that the pointer is in a moving state. The controller 180 can determine a motion of a pointer in the moving state by applying a moving threshold value.

In particular, if the motion of the pointer is greater than the moving threshold value, the controller 180 can determine that the pointer is maintained in the moving state. If the motion of the pointer is smaller than the moving threshold value over a threshold time, the controller 180 can determine that the pointer is in the grip state. Thus, when the motion of the pointer is determined again, to the controller 180 can apply the trembling threshold value. If the pointer is determined as being in the moving state, the controller 180 can perform a function corresponding to the motion of the pointer. This is expressed as a flowchart shown in FIG. 6.

Figure 6:
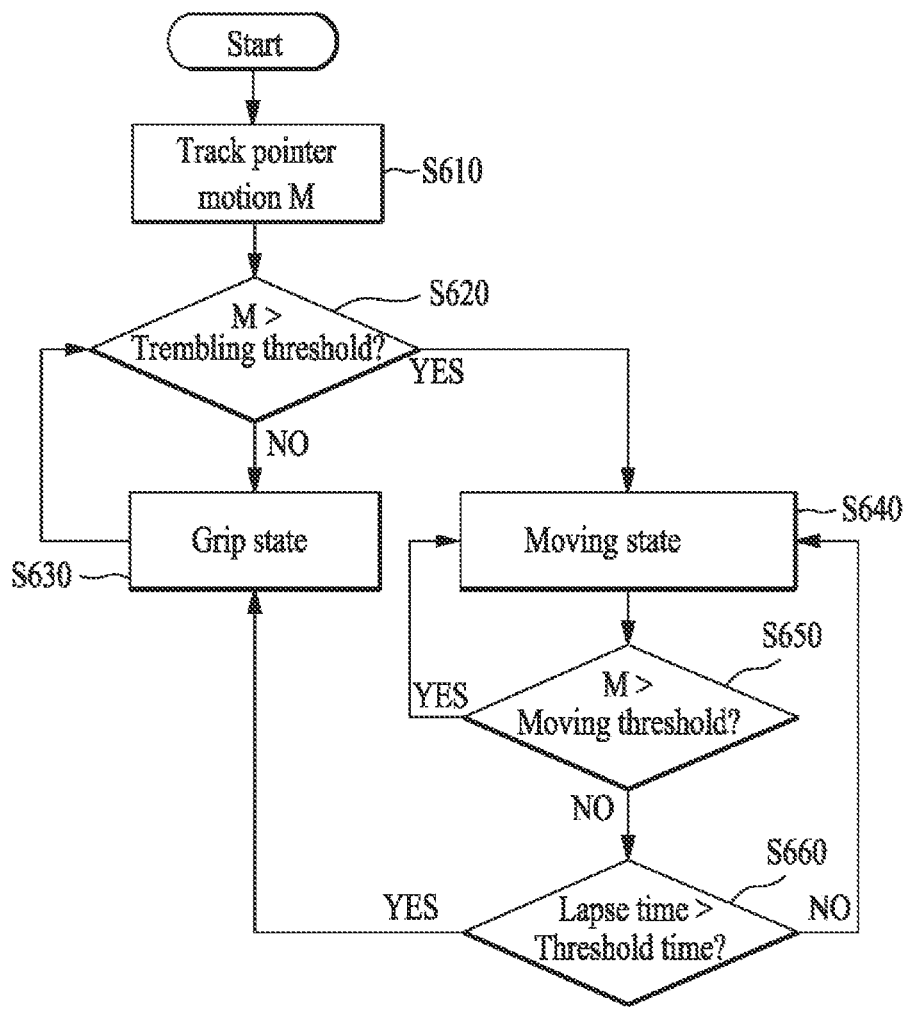
FIG. 6 is a flowchart illustrating one example of a method of determining whether a pointer is in a grip state in a mobile terminal according to one embodiment of the present invention.

FIG. 6 is a flowchart illustrating one example of a method of determining whether a pointer is in a grip state in a mobile terminal according to one embodiment of the present invention. Referring to FIG. 6, the controller 180 can track a motion M of a pointer through the touchscreen (S610). In this instance, if the value M is less than a preset trembling threshold value (No in S620), the controller 180 can determine that the pointer is in a grip state (S630). If the value M is greater than the preset trembling value (Yes in S620), the controller 180 can determine that the pointer is in a moving state (S640). In this instance, as mentioned in the foregoing description, if a motion of the M value is smaller than a moving threshold value (No in S650) and has a moving threshold value applied thereto maintained over a threshold time (Yes in S660), the controller 180 can determine that the pointer enters the grip state again. In this instance, the trembling threshold value can be set greater than the moving threshold value.

Through the grip state determining method described with reference to FIG. 6, FIG. 5(*a*) and FIG. 5(*b*) can be described in form of event records as follows. In the following, each left numeral indicates a flow of a prescribed time unit (i.e., a pointer tracking unit), Finger Down event means a touch start, Finger Move event means a pointer movement, Finger Up event means a touch release, Finger A means a finger 521 on a grip zone, and Finger B means a different finger 523.

| 0001 | Finger Down | - Finger A |
| 0002 | Finger Move | (< Trembling threshold value) - Finger A |
| 0003 | Finger Move | (< Trembling threshold value) - Finger A |
| 0008 | Finger Down | - Finger B |
| 0009 | Finger Move | (< Trembling threshold value) - Finger A |
| 0010 | Finger Move | - Finger B |
| 0011 | Finger Move | (< Trembling threshold value) - Finger A |
| 0012 | Finger Up | - Finger B- Focus execution |

Referring to the above event records, as a first finger 521 is located in a grip zone, a trembling threshold value is applied in the first place. Since a motion of the first finger 521 continues staying within the trembling threshold value, the controller 180 recognizes this as a grip state and ignores the input by the first finger. The different finger 523 appears at the timing point 0008 and a touch with the different finger 523 is cancelled. If a time amounting to 0004 is shorter than a threshold time for determining a long touch, the controller 180 recognizes that a touch input with the different finger 523 is a focus command.

Similarly, through the grip state determining method described with reference to FIG. 6, FIG. 5(*c*) and FIG. 5(*d*) can be described in form of event records as follows. In the following, the basic settings are similar to those of the above-described focus. Finger A means a finger 521 on a grip zone, Finger B means a different finger 523, and Finger C means another different finger 525.

| 0001 | Finger Down | - Finger A |
| 0002 | Finger Move | (< Trembling threshold value) - Finger A |
| 0003 | Finger Down | - Finger B |
| 0008 | Finger Down | - Finger C |
| 0009 | Finger Move | (< Trembling threshold value) - Finger A |
| 0010 | Finger Move | - Finger B |
| 0011 | Finger Move | - Finger C |
| 0012 | Finger Move | (< Trembling threshold value) - Finger A |
| 0013 | Finger Move | - Finger B |
| 0014 | Finger Move | - Finger C |

Referring to the above event records, as the first finger 521 is located in a grip zone, a trembling threshold value is applied in the first place. Since a motion of the first finger 521 continues staying within the trembling threshold value, the controller 180 recognizes it as a grip state and ignores the first finger touch input. A touch with the different finger 523 and a touch with the another different finger 525 start at different timing points, respectively but move together from a timing point 0010 to a timing point 0014. In this instance, the controller 180 can recognize that a touch pattern with two fingers is a multi-touch-drag and can perform a zoom-in/out operation depending on a varying tendency of a distance between two touch points.

Additional functions, which can be provided if a pointer located at a grip zone is determined as being in a grip state, are described in detail with reference to FIG. 7 and FIG. 8 as follows. In particular, FIG. 7 is a diagram illustrating one example of a process for changing a position of a shutter button in a mobile terminal according to one embodiment of the present invention.

Referring to FIG. 7(*a*), if a shutter button 720 is included in a grip zone 710, a user's finger 730 can be put on the shutter button 720. Thus, if the controller 180 determines that the user's hand is in a grip state, like the example shown in FIG. 7(*b*), the controller 180 can move a shutter button region 740 to an opposite side of the display, and if the shutter button 730' is touched through a different pointer, photographing can be performed.

Figure 8:
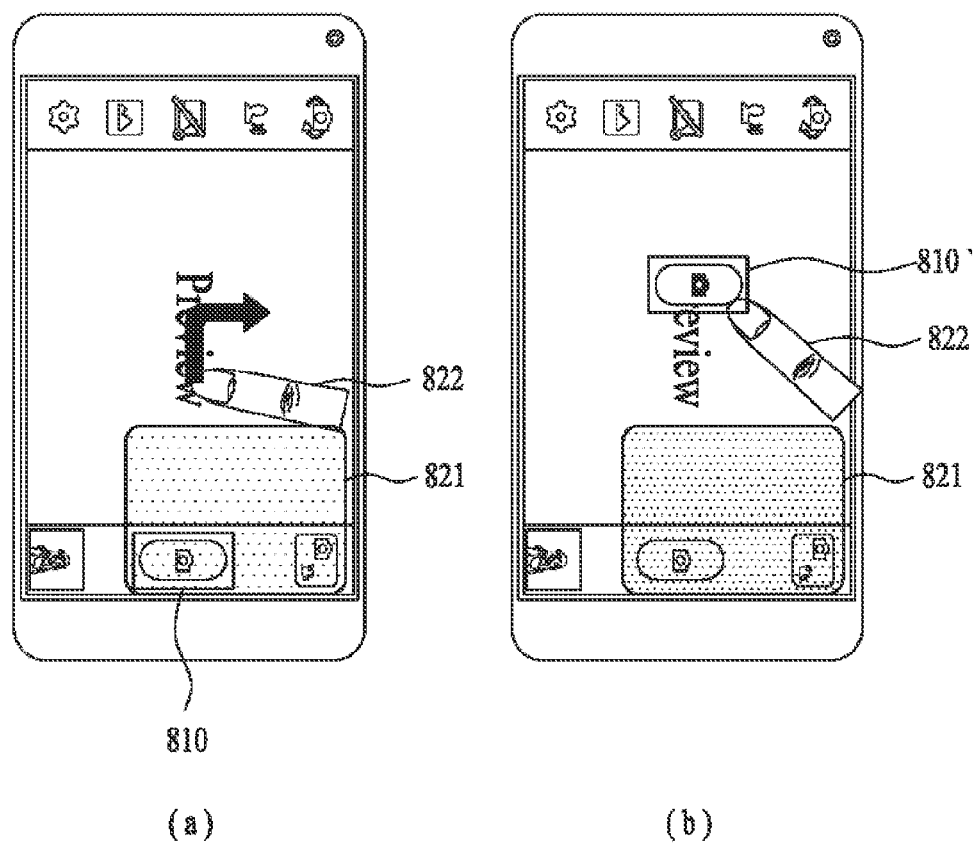
FIG. 8 is a diagram illustrating another example of a process for changing a position of a shutter button in a mobile terminal according to one embodiment of the present invention.

Next, FIG. 8 is a diagram illustrating another example of a process for changing a position of a shutter button in a mobile terminal according to one embodiment of the present invention. Referring to FIG. 8(*a*), if a shutter button 810 is included in a grip zone, a user's palm 821 can be put on the shutter button 810. Thus, if the controller 180 determines that the user's palm 821 is in a grip state, the user can drag a finger 822 to change a position of the shutter button 810. Hence, like the example shown in FIG. 8(*b*), the controller 180 can control a shutter button 810' to be displayed at a drag ended position. Thus, if the user touches the shutter button 810' with a finger 822 or a different pointer, photographing can be performed.

In addition, the methods described with reference to FIG. 7 and FIG. 8 are applicable to when a grip zone is not configured. When a grip zone is not configured, a method of preventing malfunction is described with reference to FIG. 9 as follows. In particular, FIG. 9 is a diagram illustrating one example of a process for performing a different function sequentially in accordance with a touch time for a long touch with a pointer in a mobile terminal according to one embodiment of the present invention.

Figure 9:
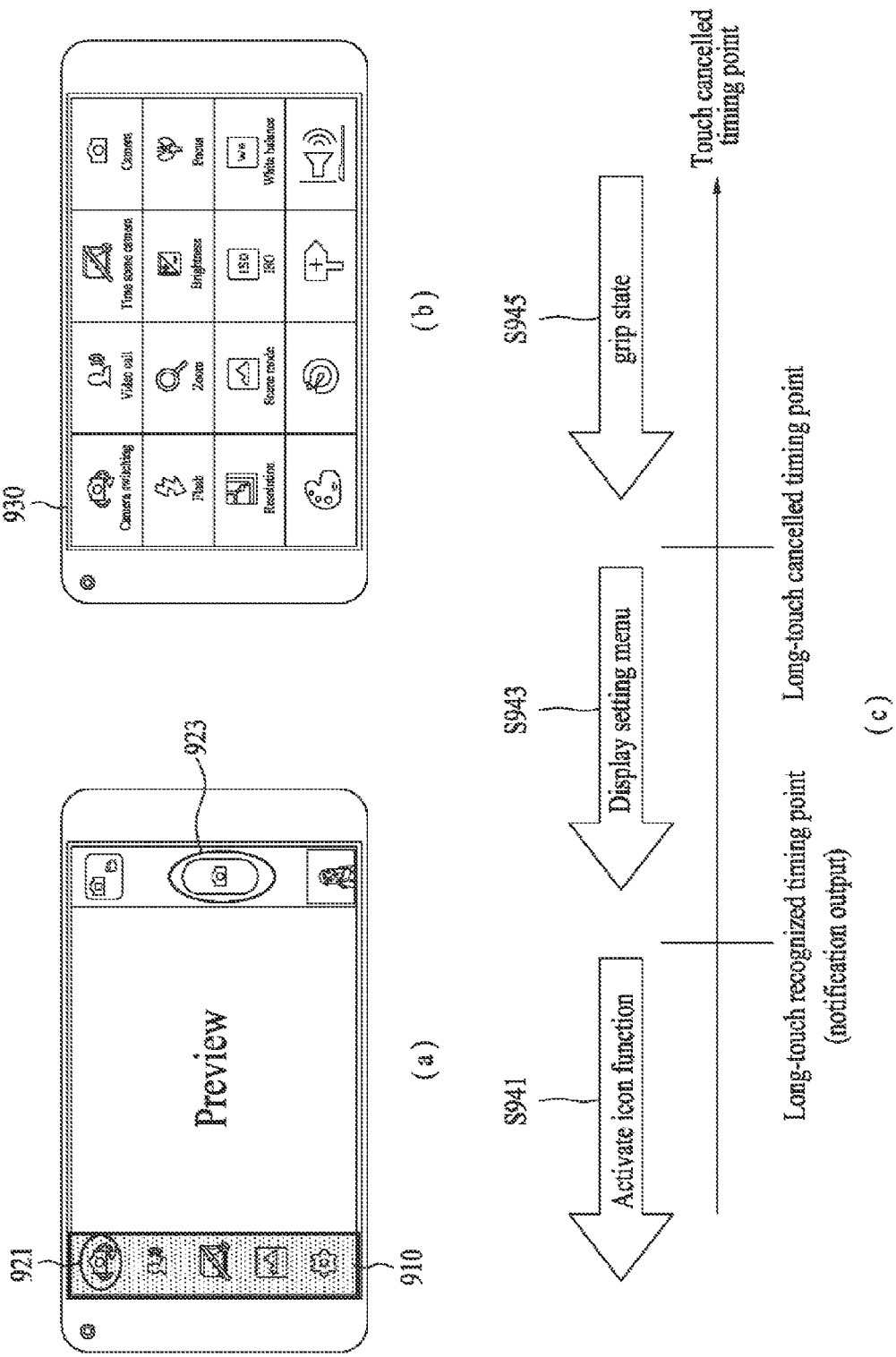
FIG. 9 is a diagram illustrating one example of a process for performing a different function sequentially in accordance with a touch time when a long touch with a pointer in a mobile terminal according to one embodiment of the present invention.

Referring to FIG. 9, if a touch input to a specific menu 921 is recognized from a menu region 910 in a general mobile terminal, a function corresponding to the specific menu 921 is activated (FIG. 9(a)). If a long touch is recognized, a setting menu 930 can be displayed (FIG. 9(b)). However, if a grip zone of the present invention is not configured, a setting menu may be unintentionally displayed by a user's grip. Therefore, in another aspect of one embodiment of the present invention, after a lapse of a prescribed time from recognition of a long touch with a pointer, a function corresponding to the long touch is cancelled. In addition, the controller 180 can recognize that the corresponding pointer is in a grip state.

This method is represented as a flowchart shown in FIG. 9(c). In particular, FIG. 9(c) illustrates when the touch to the specific menu icon 921 in the menu region 910 with the pointer is maintained in the situation shown in FIG. 9(a). While a time of the touch with the pointer is shorter than a long-touch recognized time, a function corresponding to the menu icon is activated (S941). After a lapse of the long-touch recognized time, the setting menu 930 can be displayed (S943). Further, the controller 180 can use vibration, sound and the like in order to inform a user that the setting menu is displayed. If a prescribed time expires after the arrival at the long-touch recognized time, the controller 180 recognizes the touch with the pointer as a grip state (S945) and can control the setting menu to disappear. By the above-described method, to the controller 180 can prevent a function corresponding to a long touch from continuing to be displayed due to a grip.

Photographing in Consideration of a Moving State of Subject or Mobile Terminal

According to another embodiment of the present invention, in consideration of a moving state of a subject or a mobile terminal, to the controller 180 can change a photograph mode or to initiate a photographing automatically. In the following description, a mobile terminal and controlling method thereof according to another embodiment of the present invention are described with reference to FIGS. 10 to 15, by which a photographing state can be changed in consideration of a moving state of a subject.

Generally, a making a video or a burst shooting may be more appropriate when a subject is moving fast over a predetermined level. Hence, when a subject is tracked, and if a motion of the tracked subject exceeds a threshold value, a photographing can be performed more pleasantly and conveniently by switching a general photograph mode to a burst mode or a video mode automatically. This is described with reference to FIG. 10 as follows.

Figure 10:
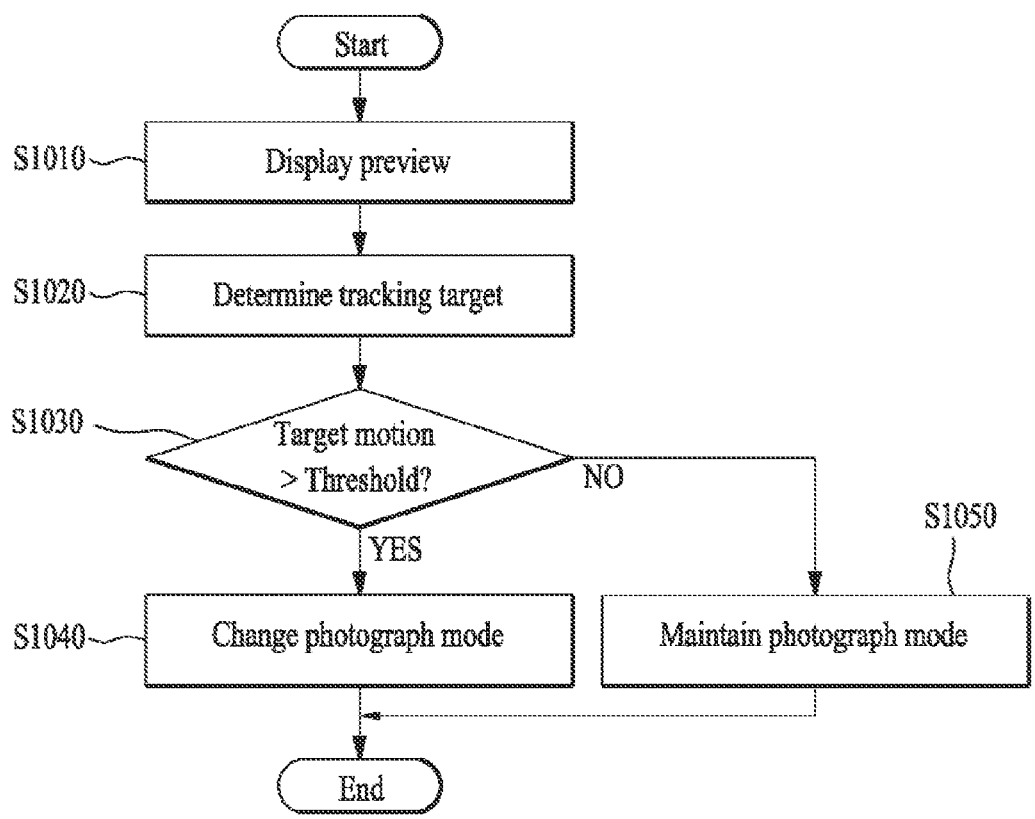
FIG. 10 is a diagram illustrating one example of a process for performing a photograph mode change in response to a motion of a tracking target subject in a mobile terminal according to another embodiment of the present invention.

FIG. 10 is a diagram illustrating one example of a process for performing a photograph mode change in response to a motion of a tracking target subject in a mobile terminal according to another embodiment of the present invention. Referring to FIG. 10, a preview image can be displayed in camera photograph mode (S1010). When the preview image is displayed, a tracking target subject can be determined in the preview image in response to a user's command input (S1020). Hence, the controller 180 determines a moving level of the tracking target subject in the preview image. If the determined moving level is greater than a threshold value (Yes in S1030), the controller 180 can change a photograph mode into a burst mode or a video mode (S1040). On the contrary, if the moving level of the tracking target subject is equal to or smaller than the threshold value (No in S1030), the photograph mode can be maintained (S1050).

In determining the moving level of the tracking target subject, the controller 180 can simply consider a position displayed within the preview image only or may further consider a relative position change with another neighbor subject as well. The changed mode may include a predetermined one of the burst mode and the video mode. The changed mode may be determined in accordance with the moving level.

A detailed configuration of the above-described method implemented in the mobile terminal is described with reference to FIG. 11 as follows. In particular, FIG. 11 is a diagram illustrating one example of a process for performing a photograph mode change in response to a motion of a subject in a mobile terminal according to another embodiment of the present invention.

Referring to FIG. 11, as a camera photograph mode is enabled in the mobile terminal, a preview image is displayed (FIG. 11(a)). In addition, if a user applied a long touch input to the touchscreen, a visual effect 1110 for specifying a tracking target subject can be displayed. The user can perform a size change 1110' of the visual effect by dragging a vertex part of the visual effect (FIG. 11(b)). In addition, the user can move the visual effect by dragging an edge part. Once the size adjustment and position determination of the visual effect are complete, the user can touch the visual effect displayed part twice in a prescribed time.

Hence, the controller 180 determines the subject, which is located within the visual effect in the preview image, as a tracking target subject and can then determine whether a motion of the corresponding subject is greater than a threshold value. If the motion of the corresponding subject is greater than the threshold value, the controller 180 outputs a message 1120 indicating the mode switching and changes a shutter button into a record button 1130.

Also, instead of changing a mode in consideration of a motion of a subject, it to the controller 180 can set a photographing to be performed automatically. This may be especially useful for a photographing in dark surroundings. For instance, when a group photo is taken, if people's motion is equal to or smaller than a predetermined range (e.g., posing still for a photo), photographing can be automatically performed. This is described in detail with reference to FIG. 12 as follows.

Figure 12:
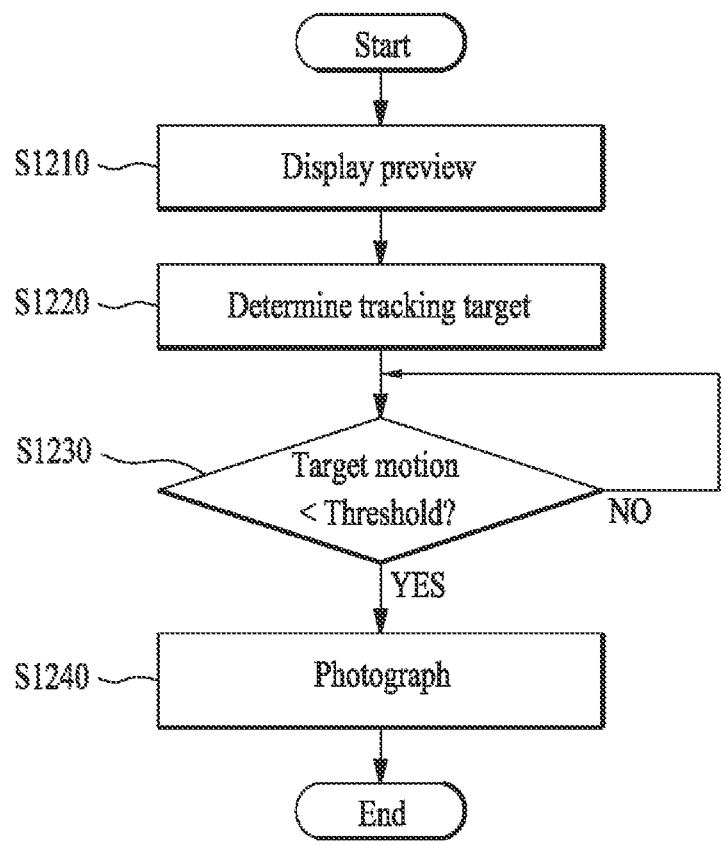
FIG. 12 is a diagram illustrating one example of a process for performing an auto-photographing in response to a motion of a tracking target subject in a mobile terminal according to another embodiment of the present invention.

FIG. 12 is a diagram illustrating one example of a process for performing an auto-photographing in response to a motion of a tracking target subject in a mobile terminal according to another embodiment of the present invention.

Referring to FIG. 12, a preview image can be displayed in camera photograph mode (S1210). When the preview image is displayed, a tracking target subject can be determined in the preview image in response to a user's command input (S1220). Hence, the controller 180 determines a moving level of the tracking target subject in the preview image. If the determined moving level is smaller than a threshold value (Yes in S1230), the controller 180 can control photographing to be automatically performed (S1240). On the contrary, if the moving level of the tracking target subject is equal to or greater than the threshold value (No in S1230), a standby mode can be maintained.

In the following description, a mobile terminal and controlling method thereof according to another embodiment of the present invention are described with reference to FIGS. 13 to 15, by which a panoramic photographing can be performed automatically in consideration of a motion of a mobile terminal. Generally, when a panoramic photographing is performed, to the controller 180 can photograph a panoramic image by changing a setting into a panoramic photograph mode from a normal photograph mode in an active state of a camera application. In order to settle such inconvenience, according to one embodiment of the present embodiment, a panoramic image can be automatically photographed by analyzing posture information of a mobile terminal.

First, a method for the controller 180 to determine a posture change of the mobile terminal through a Kalman filter is described with reference to FIG. 13. In this instance, a Kalman filter is an efficient recursive computational solution for tracking a time-dependent state vector by real time in accordance with a time having equations of noisy motion using a least square method. Kalman filter is used to discover a signal from noise in order for a single system to predict a time-dependent change.

Figure 13:
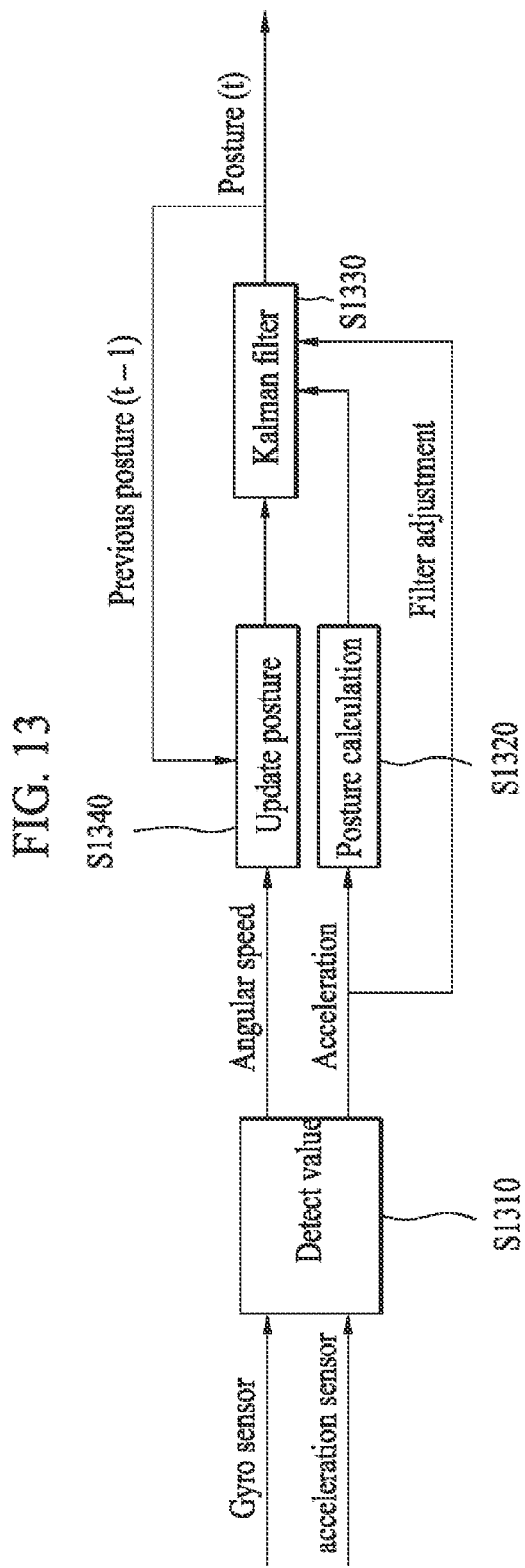
FIG. 13 is a diagram illustrating one example of a process for determining a posture through acceleration and angular speed in a mobile terminal according to another embodiment of the present invention.

FIG. 13 is a diagram illustrating one example of a process for determining a posture through acceleration and angular speed in a mobile terminal according to another embodiment of the present invention. Referring to FIG. 13, an angular speed is detected through a gyro sensor of the sensing unit 140 and an acceleration can be detected through an acceleration sensor (S1310). A posture is calculated through the detected acceleration (S1320). The calculated posture value can be used to derive a posture through Kalman filter (S1330). In this instance, to the controller 180 can derive a current posture by inputting both a posture value and an angular speed updated through a previous posture to Kalman filter.

Further, in order to create a panoramic image, a plurality of images configured to overlap each other in part are used. This is because feature information can be extracted for a presence of an overlapping part. According to the present embodiment, a smallest region for the extraction of feature information is defined as an overlapping region. In particular, the overlapping region can be configured variable in accordance with camera performance or settings. A shutter timing using an overlapping region for performing a panoramic photographing is described with reference to FIG. 14 as follows.

FIG. 14 is a diagram illustrating one example of a process for determining a shutter timing through regions having camera view angles overlap each other therein between mobile terminal movements in a mobile terminal according to another embodiment of the present invention. Referring to FIG. 14(a), as the camera 121 of the mobile terminal is shifted in parallel in a right direction, a view angle of the camera 121 is shifted as well. When an image corresponding to a first view angle 1410 is taken, the controller 180 can determine a moment, at which an overlapping region 1430 in a preset size is generated, as a shutter timing.

If a photographing is automatically performed through a view angle 1420 of the corresponding moment, the controller 180 can obtain two source images for the panoramic image creation. When a single panoramic image is created using three source images, referring to FIG. 14(b), photographing can be performed at the timings at which two overlapping regions 1431 and 1432 can be created, respectively.

In the following description, a process for performing a panoramic photographing by combining the former methods described with reference to FIG. 13 and FIG. 14 is explained in detail with reference to FIG. 15. In particular, FIG. 15 is a flowchart illustrating one example of a process for performing a panoramic photographing automatically in a mobile terminal according to another embodiment of the present invention.

Referring to FIG. 15, the controller 180 can determine a posture of the camera 121 using an acceleration and angular speed detected through the sensing unit 140 (S1510). In addition, the controller 180 can determine a view angle of the camera 121 (S1520). In this instance, the view angle may include a fixed value for a single focus lens. Also, the view angle may be variable for each focal distance when a zoom lens.

Subsequently, the controller 180 determines whether a previous view angle or a current view angle exists in an overlapping region in the course of moving through the determined posture of the camera (S1530). If the current view angle corresponds to the overlapping region (S1540), the controller 180 can control the camera in order for a photographing to be automatically performed (S1550).

Accordingly, embodiments of the present invention provides the following advantages. First of all, the present invention facilitates a photographing action using a camera provided to a mobile terminal. Secondly, an embodiment of the present invention determines whether a pointer located at a grip zone enters a grip state, thereby improving a grip feeling of a mobile terminal and preventing malfunction of the mobile terminal. Thirdly, an embodiment of the present invention changes a photograph mode or performs an auto-photographing in accordance with a motional state of a subject, thereby facilitating a photographing operation.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be performed without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
   entering, via a controller controlling a camera of the mobile terminal, a camera photograph mode;
   determining, via the controller of the mobile terminal, a position of a first pointer contacting a touchscreen in the camera photograph mode and whether the first pointer is in a first state or a second state when the first pointer is located in a preset region on the touchscreen, wherein the first state corresponds to a motion of the first pointer being equal to or lower than a predetermined reference and the second state corresponds to the motion of the first pointer being greater than the predetermined reference;
ignoring a touch input through the pointer, when the first pointer is determined as being in the first state; and
performing a function corresponding to the touch input through the pointer, when the first pointer is determined as being in the second state.

2. The method of claim 1, wherein the first state corresponds to a motion of the first pointer being equal to or smaller than a first threshold value,
wherein the second state corresponds to the motion of the first pointer being equal to or greater than the first threshold value and a second threshold value, and
wherein if the motion of the first pointer in the second state is equal to or lower than the second threshold value and is maintained over a predetermined time, the determining step determines the first pointer is in the first state.

3. The method of claim 1, wherein the preset region includes an edge region of the touchscreen.

4. The method of claim 1, further comprising:
changing a position of a shutter button displayed on the touchscreen, when the first pointer is determined as being in the first state on the shutter button.

5. The method of claim 4, wherein changing the position of the shutter button comprises:
detecting whether a position of a second pointer on the touchscreen is changed; and
displaying the shutter button at the changed position, when the position of the second pointer is changed.

6. A method of controlling a mobile terminal, the method comprising:
displaying a preview image on a touchscreen by activating a camera;
determining a tracking target in the preview image, wherein the tracking target is sensed by the camera; and
changing, via a controller of the mobile terminal, a photograph mode from a first mode to a second mode, when a motion of the determined tracking target is greater than a threshold value,
wherein the determining the tracking target comprises:
displaying a visual effect for specifying the tracking target in a prescribed configuration on the preview image; and
determining a subject included in the visual effect as the tracking target.

7. The method of claim 6, wherein the second photograph mode includes one of a burst mode and a video mode and the first photograph mode includes a still picture mode.

8. The method of claim 6, further comprising:
changing at least one of a size of the visual effect and a position of the visual effect.

9. A mobile terminal, comprising:
a wireless communication unit configured to provide wireless communication;
a camera configured to enter a camera photograph mode; and
a controller configured to:
determine a position of a first pointer contacting a touchscreen in the camera photograph mode and whether the first pointer is in a first state or a second state when the first pointer is located in a preset region on the touchscreen,
wherein the first state corresponds to a motion of the first pointer being equal to or lower than a predetermined reference and the second state corresponds to the motion of the first pointer being greater than the predetermined reference,
ignore a touch input through the pointer, when the first pointer is determined as being in the first state, and
perform a function corresponding to the touch input through the pointer, when the first pointer is determined as being in the second state.

10. The mobile terminal of claim 9, wherein the first state corresponds to a motion of the first pointer being equal to or smaller than a first threshold value,
wherein the second state corresponds to the motion of the first pointer being equal to or greater than the first threshold value and a second threshold value, and
wherein if the motion of the first pointer in the second state is equal to or lower than the second threshold value and is maintained over a predetermined time, the determining step determines the first pointer is in the first state.

11. The mobile terminal of claim 9, wherein the preset region includes an edge region of the touchscreen.

12. The mobile terminal of claim 9, wherein the controller is further configured to:
change a position of a shutter button displayed on the touchscreen, when the first pointer is determined as being in the first state on the shutter button.

13. The mobile terminal of claim 12, wherein the controller if further configured to:
detect whether a position of a second pointer on the touchscreen is changed, and
display the shutter button at the changed position, when the position of the second pointer is changed.

14. A mobile terminal, comprising:
a wireless communication unit configured to provide wireless communication;
a camera configured to sense a tracking target;
a touchscreen configured to display a preview image on a touchscreen by activating the camera; and
a controller configured to:
display a visual effect for specifying the tracking target in a prescribed configuration on the preview image,
determine a subject included in the visual effect as the tracking target, and
change photograph mode from a first mode to a second mode, when a motion of the determined tracking target is greater than a threshold value.

15. The mobile terminal of claim 14, wherein the second photograph mode includes one of a burst mode and a video mode and the first photograph mode includes a still picture mode.

16. The mobile terminal of claim 14, wherein the controller is further configured to:
change at least one of a size of the visual effect and a position of the visual effect.

* * * * *